United States Patent
Baker et al.

(10) Patent No.: US 6,992,263 B1
(45) Date of Patent: Jan. 31, 2006

(54) HAND-HELD LASER WELDER REMOTE CONTROL CONSOLE

(75) Inventors: Martin C. Baker, Budd Lake, NJ (US); Clyde R. Taylor, Laurens, SC (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/057,337

(22) Filed: Feb. 11, 2005

(51) Int. Cl.
*B23K 26/00* (2006.01)
*B23K 26/20* (2006.01)

(52) U.S. Cl. .............................. 219/121.61; 219/121.6; 219/121.63

(58) Field of Classification Search ............. 219/121.6, 219/121.63, 121.64, 121.61, 121.62; 200/176, 200/177, 178
See application file for complete search history.

(56) References Cited

U.S. PATENT DOCUMENTS

| | | | |
|---|---|---|---|
| 3,267,249 A | 8/1966 | Veth | |
| 3,464,534 A | 9/1969 | Muncheryan | |
| 3,775,586 A * | 11/1973 | Flint et al. ............. | 219/121.63 |
| 4,572,189 A | 2/1986 | Smith et al. | |
| 4,587,396 A * | 5/1986 | Rubin ................... | 219/121.78 |
| 4,826,431 A | 5/1989 | Fujimura et al. | |
| 5,098,426 A | 3/1992 | Sklar et al. | |
| 5,225,831 A * | 7/1993 | Osborn ........................ | 341/20 |
| 5,272,716 A | 12/1993 | Soltz et al. | |
| 5,683,598 A | 11/1997 | Moro | |
| 6,177,640 B1 * | 1/2001 | Okabe et al. ............... | 200/6 A |
| 6,230,072 B1 | 5/2001 | Powell et al. | |
| 2003/0213786 A1 * | 11/2003 | Baker et al. ........... | 219/121.64 |

* cited by examiner

*Primary Examiner*—Geoffrey S. Evans
(74) *Attorney, Agent, or Firm*—Ingrassia Fisher & Lorenz

(57) ABSTRACT

A control console that is used in conjunction with a hand-held laser welding wand is adapted to couple to an electrically controllable filler media supply source, and to an electrically controllable laser source. The control console includes a control switch that is electrically coupled to the filler media supply source and the laser source and is configured to such that an operator can independently and simultaneously control the filler media supply source to either supply or not supply filler media, and the laser source to either emit or not emit laser light therefrom. The control switch is preferably further configured to control the optical power level of the laser source.

24 Claims, 6 Drawing Sheets

HAND-HELD LASER WELDER REMOTE CONTROL CONSOLE

TECHNICAL FIELD

The present invention relates laser welding and, more particularly, to a mobile hand-held laser welding system.

BACKGROUND

Many components in a jet engine are designed and manufactured to withstand relatively high temperatures. Included among these components are the turbine blades, vanes, and nozzles that make up the turbine engine section of the jet engine. In many instances, various types of welding processes are used during the manufacture of the components, and to repair the components following a period of usage. In addition, other non-aerospace applications such as, for example, industrial and commercial tooling and die maintenance may also benefit from the laser welding repair process. Moreover, various types of welding technologies and techniques may be used to implement these various welding processes. However, one particular type of welding technology that has found increased usage in recent years is laser welding technology.

Laser welding technology uses a high power laser to manufacture parts, components, subassemblies, and assemblies, and to repair or dimensionally restore worn or damaged parts, components, subassemblies, and assemblies. In general, when a laser welding process is employed, laser light of sufficient intensity to form a melt pool is directed onto the surface of a metal work piece, while a filler material, such as powder, wire, or rod, is introduced into the melt pool. Until recently, such laser welding processes have been implemented using automated laser welding machines. These machines are relatively large, and are configured to run along one or more preprogrammed paths.

Although programmable laser welding machines, such as that described above, are generally reliable, these machines do suffer certain drawbacks. For example, a user may not be able to manipulate the laser light or work piece, as may be needed, during the welding process. This can be problematic for weld processes that involve the repair or manufacture of parts having extensive curvature and/or irregular or random distributed defect areas. Thus, in order to repair or manufacture parts of this type, the Assignee of the present application developed a portable, hand-held laser welding wand. Among other things, this hand-held laser welding wand allows independent and manual manipulation of the laser light, the filler material, and/or the work piece during the welding process. An exemplary embodiment of the hand-held laser welding wand is disclosed in U.S. Pat. No. 6,593,540, which is entitled "Hand Held Powder-Fed Laser Fusion Welding Torch," and the entirety of which is hereby incorporated by reference.

The hand-held laser welding wand, such as the one described above, provides the capability to perform manual 3-D adaptive laser welding on components. During use, the wand may be coupled to various support subsystems. For example, the wand may receive laser light, cooling fluid, filler media, and, in some instances, inert gas, from appropriate support subsystems. Typically, a manual control system, that includes a plurality of manually operated switches, is used to control one or more of these subsystems. For example, in one implementation, the manual control system may include two foot-actuated switches and a hand-actuated switch. One of the foot-actuated switches may be used to control the power level of the laser light emitted from the laser light support subsystem, the other foot-actuated switch may be used to control the supply of filler media from the filler media support system, and the hand-actuated switch may used to enable and disable laser light emission from the laser source. In some instances, welding operations using the hand-held laser welding wand may need to be performed in areas where the simultaneous manipulation of the hand-actuated and foot-actuated switches may be either impractical or inconvenient.

Hence, there is a need for a system and method for the hand-held laser welding wand that is fully transportable to areas remote from a work shop environment, so that the hand-held laser welding wand may be used at a remote work location. The present invention addresses at least this need.

BRIEF SUMMARY

The present invention provides a control console for the hand-held laser welding wand that significantly simplifies operation and control of the wand and its support subsystems.

In one embodiment, and by way of example only, a control console for a hand-held laser welding wand including a housing, a first electrical interconnect, a second electrical interconnect, and a control switch. The first electrical interconnect is mounted on the housing and is adapted to couple to an electrically controllable filler media supply source. The second electrical interconnect is mounted on the housing and is adapted to couple to an electrically controllable laser source. The control switch is mounted on the housing and is electrically coupled to the first and second electrical interconnects. The control switch is configured to independently and simultaneously control the filler media supply source to either supply or not supply filler media, and the laser source to either emit or not emit laser light therefrom.

In another exemplary embodiment, a control console for a hand-held laser welding wand includes a housing, a first electrical interconnect, a second electrical interconnect, and a control switch. The first electrical interconnect is mounted on the housing and is adapted to couple to an electrically controllable filler media supply source. The second electrical interconnect is mounted on the housing and is adapted to couple to an electrically controllable laser source. The control switch is mounted on the housing and is electrically coupled to the first and second electrical interconnects. The control switch is configured to independently and simultaneously control the filler media supply source to either supply or not supply filler media, the laser source to either emit or not emit laser light therefrom at an optical power level, and the optical power level at which the laser source emits the laser light.

In yet another exemplary embodiment, a control console for a hand-held laser welding wand includes a housing, a first electrical interconnect, a second electrical interconnect, a joystick, and an emission control switch. The first electrical interconnect is mounted on the housing and is adapted to couple to an electrically controllable filler media supply source. The second electrical interconnect is mounted on the housing and is adapted to couple to an electrically controllable laser source. The joystick is electrically coupled to the first and second electrical interconnects, and is movable in a direction having a vector component along a first axis and a direction having a vector component along a second axis. The joystick is configured, upon movement in the direction having a vector component along the first axis, to control the filler media supply source to supply or not supply filler media and, upon movement in the direction having a vector component along the second axis, to control the optical power at which the laser source will emit laser light.

Other independent features and advantages of the preferred control console will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
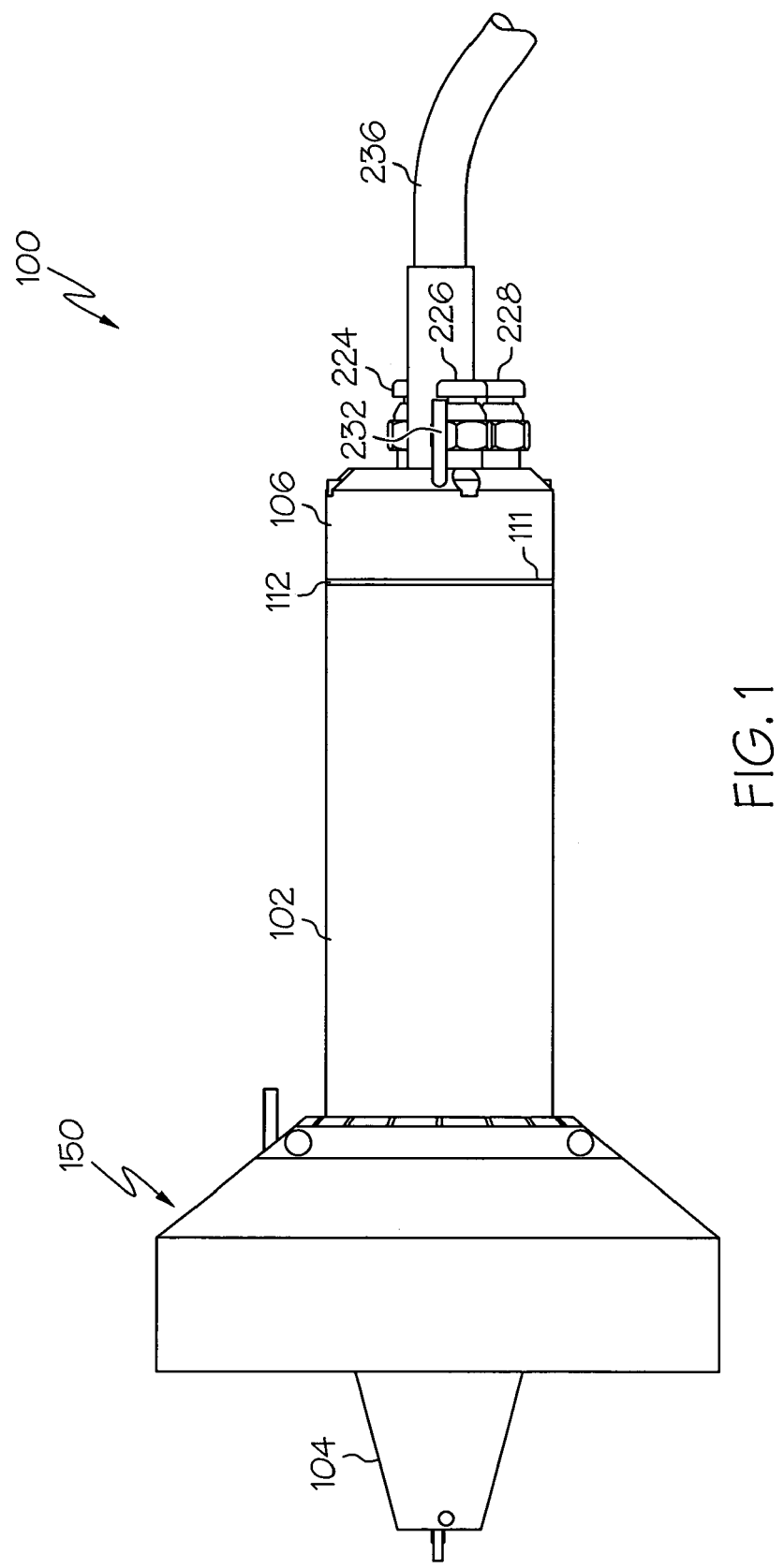
FIG. 1 is a side view of an exemplary hand-held laser welding wand.
Figure 2:
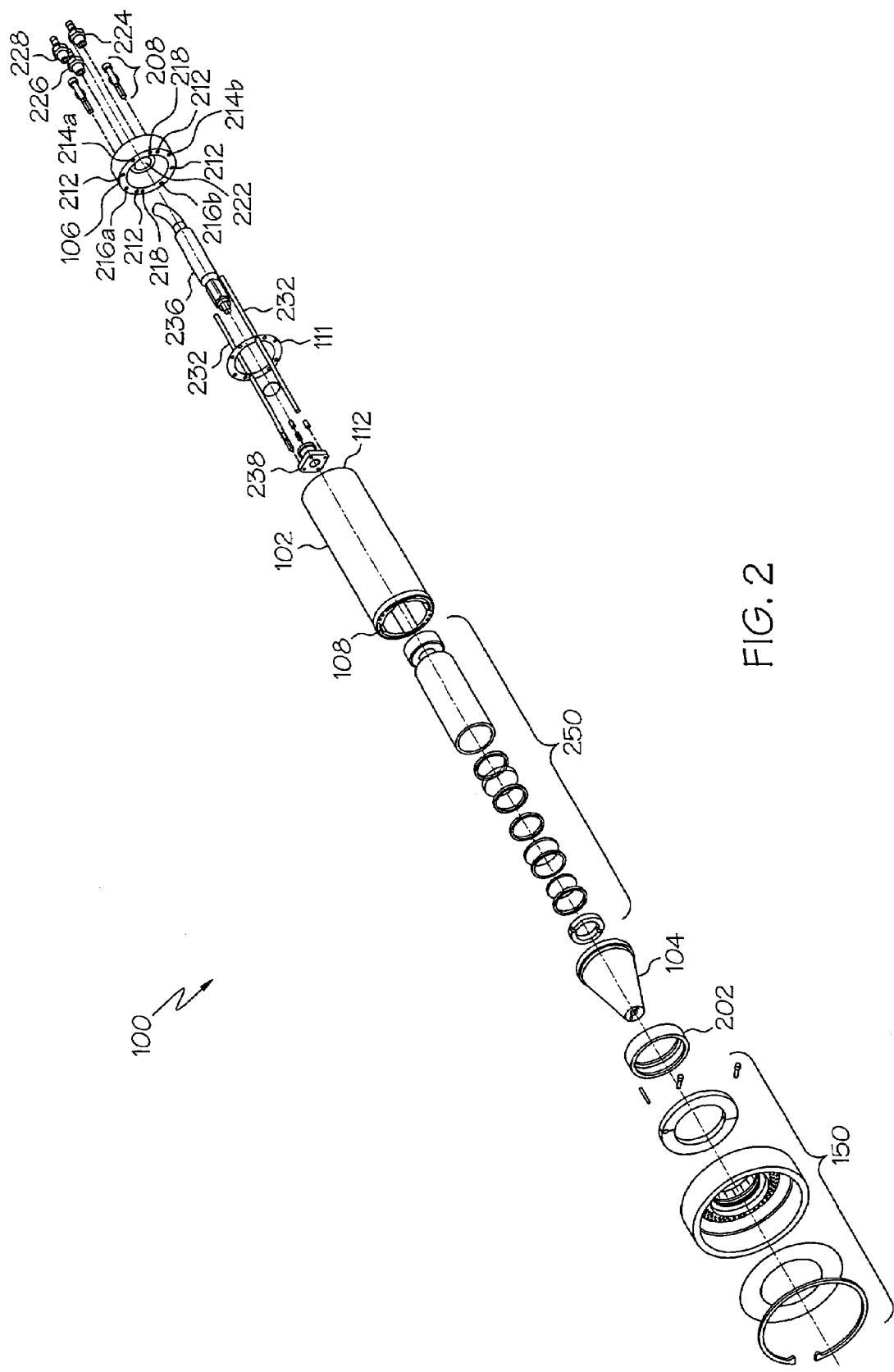
FIG. 2 is a perspective exploded view of the hand-held laser welding wand of FIG. 1.
Figure 3:
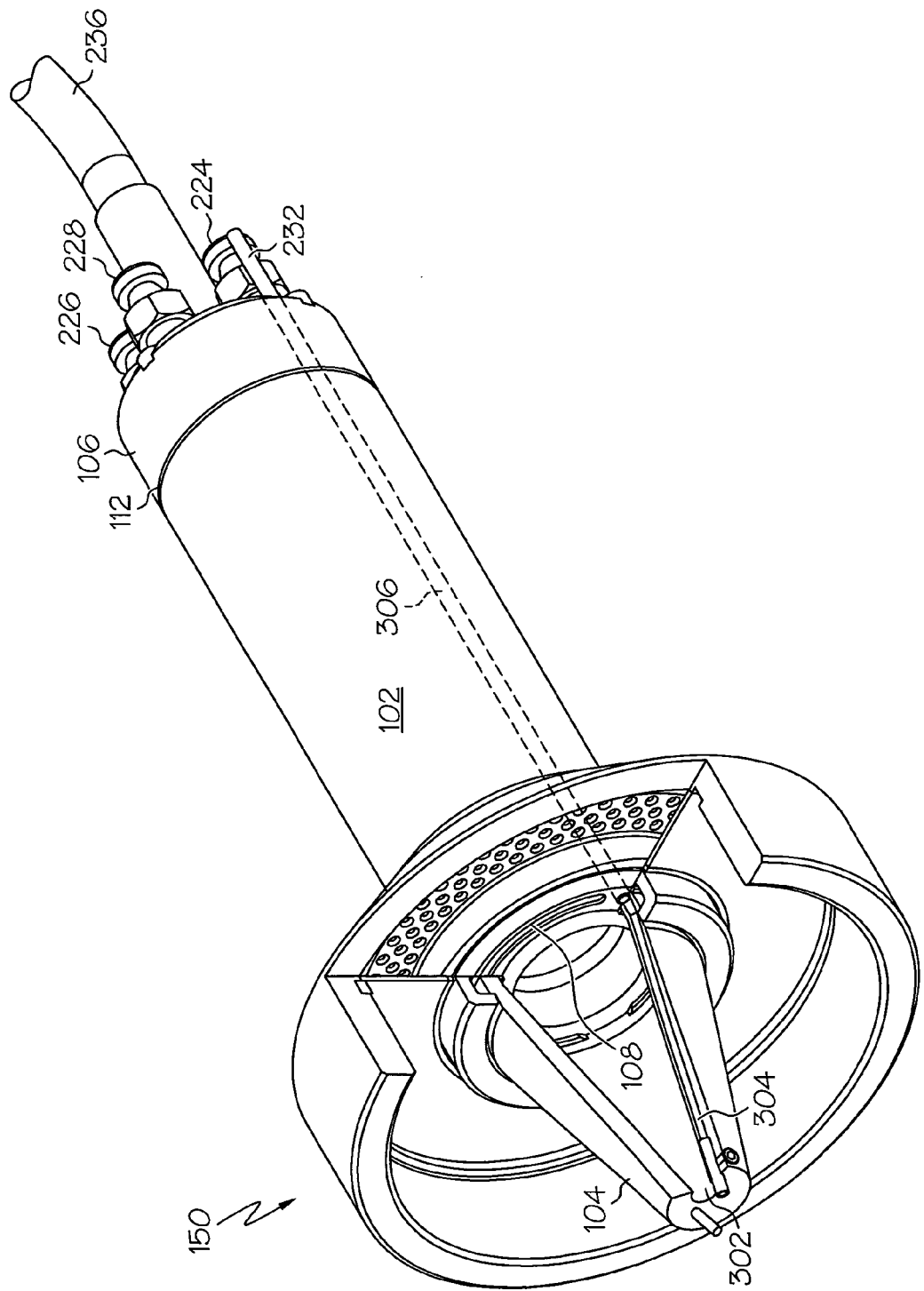
FIG. 3 is a partial cut-away perspective views of the hand-held laser welding wand shown in FIGS. 1 and 2.

Turning now to the description, and with reference first to FIGS. 1–3, an exemplary hand-held laser welding wand 100 is shown, and includes a main body 102, a nozzle 104, and an end cap 106. The main body 102, which is preferably configured as a hollow tube, includes a first end 108 (see FIG. 2), a second end 112, and a plurality of orifices and flow passages that extend between the main body first and second ends 108, 112. The orifices and flow passages are used to direct various fluids and other media through the main body 102. Included among these media are coolant, such as water, inert gas, such as Argon, and filler materials, such as powder, wire, or liquid. These orifices and flow passages are in fluid communication with orifices and flow passages in the nozzle 104, in the end cap 106, or both. A description of the specific configuration of each of the orifices and flow paths in the main body 102 is not needed. Thus, at least the coolant and gas orifices and flow passages in the main body 102 will not be further described. The main body filler media orifices and flow passages will be mentioned further below merely for completeness of description.

The nozzle 104 is coupled to the main body first end 108 via a threaded nozzle retainer ring 202. More specifically, in the depicted embodiment the main body 102 has a plurality of threads formed on its outer surface adjacent the main body first end 108. Similarly, the nozzle retainer ring 202 has a plurality of threads formed on its inner surface that mate with the main body threads. Thus, the nozzle 104 is coupled to the main body 102 by abutting the nozzle 104 against the main body first end 108, sliding the nozzle retainer ring 202 over the nozzle 104, and threading the nozzle retainer ring 202 onto the main body 102. It will be appreciated that the nozzle 104 could be coupled to the main body first end 108 in a different manner. For example, the nozzle 104 and main body 102 could be configured so that the nozzle 104 is threaded directly onto the main body first end 108.

With reference to FIG. 3, it is seen that the nozzle 104 includes an aperture 302 that extends through the nozzle 104. When the nozzle 104 is coupled to the main body 102, the nozzle aperture 302 is in fluid communication with the inside of the hollow main body 102. It is through this aperture 302 that laser light and gas pass during laser welding operations. The nozzle 104 additionally includes a plurality of filler media flow passages 304. The nozzle filler media flow passages 304 pass through the nozzle 104 and are in fluid communication with filler media delivery flow passages 306 that extend through the main body 102. The filler media delivery flow passages 304, 306 are used to deliver a filler media to a work piece (not shown).

The end cap 106 is coupled to the main body second end 112 via a gasket 111 and a plurality of end cap fasteners 208. In particular, the end cap fasteners 208 extend, one each, through a plurality of end cap fastener openings 212 (see FIG. 2) formed through the end cap 106, and into the main body second end 110. In addition to the end cap fastener openings 212, the end cap 106 also includes two coolant passages 214, 216, a gas supply passage (not shown), a plurality of filler media flow passages 218, and a cable opening 222. The two coolant passages include a coolant supply passage 214 and a coolant return passage 216. The coolant supply passage 214, which splits within the end cap 106 into two supply passages 214a, 214b, directs coolant, such as water, into appropriate coolant flow passages formed in the main body 102. The coolant return passage 216, which also splits within the end cap 106 into two return passages 216a, 216b, receives coolant returned from appropriate coolant flow passages formed in the main body 102. The non-illustrated gas supply passage directs gas into the main body 102.

The end cap filler media flow passages 218 are in fluid communication with the nozzle filler media flow passages 304 via the main body filler media flow passages 306. The end cap filler media passages 218 may be coupled to receive any one of numerous types of filler media including, but not limited to, powder filler and wire filler. The filler media may be fed into the end cap filler media flow passages 218 manually, or the filler media may be fed automatically from a filler media feed assembly (not shown). In the depicted embodiment, a plurality of filler media liner tubes 232 is provided. These filler media liner tubes 232 may be inserted, one each, through one of the end cap filler flow media passages 218, and into the main body filler media flow passages 306. The filler media liner tubes 232 further guide the filler media into and through the main body 102, and into the nozzle filler media flow passages 304. The filler media liner tubes 232 also protect the filler media flow passages against any erosion that could result from filler media flow through the flow passages. Although use of the filler media liner tubes 232 is preferred, it will be appreciated that the wand 100 could be used without the filler media liner tubes 232.

The cable opening 222 in the end cap 106 is adapted to receive an optical cable 236. When the optical cable 236 is inserted into the cable opening 222, it extends through the end cap 106 and is coupled to a cable receptacle 238 mounted within the main body 102. The optical cable 236 is used to transmit laser light from a laser source (not shown) into the main body 102. An optics assembly 250 is mounted within the main body 102 and is used to appropriately collimate and focus the laser light transmitted through the optical cable 236 and receptacle 238, such that the laser light passes through the nozzle aperture 302 and is focused on a point in front of the nozzle aperture 302.

The laser light transmitted through the nozzle aperture 302 is used to conduct various types of welding processes on various types, shapes, and configurations of work pieces. In many instances, the work pieces are formed, either in whole or in part, of various materials that require an inert atmosphere at least near the weld pool during welding operations. Thus, the hand-held laser welding wand 100 additionally includes a gas lens assembly 150, which is mounted on the wand main body 102 and surrounds a portion of the nozzle 104. The gas lens assembly 150 is adapted to receive a flow of inert gas from the non-illustrated gas source and is configured, upon receipt upon receipt of the gas, to develop an inert gas atmosphere around the weld pool.

As was just noted, the optical cable 236 transmits laser light from a laser source for use by the wand 100. In addition, barbed fittings 224, 226, 228 are coupled to the coolant supply passage 214, the coolant return passage 216, and the non-illustrated gas supply passage, respectively, in the end cap 106. These barbed fittings 224, 226, 228 are used to couple the respective openings to hoses or other flexible conduits that are in fluid communication with a coolant source or a gas source, as may be appropriate. It will be appreciated that other types of fittings, such as compression or threaded fittings, may be substituted for one or more of the barbed fittings 224, 226, 228, as needed or desired, based on the particular types of hoses or conduits used. Moreover, the filler media supply tubes 232 are preferably in fluid communication with one or more filler media sources via one or more filler media conduits.

Figure 4:
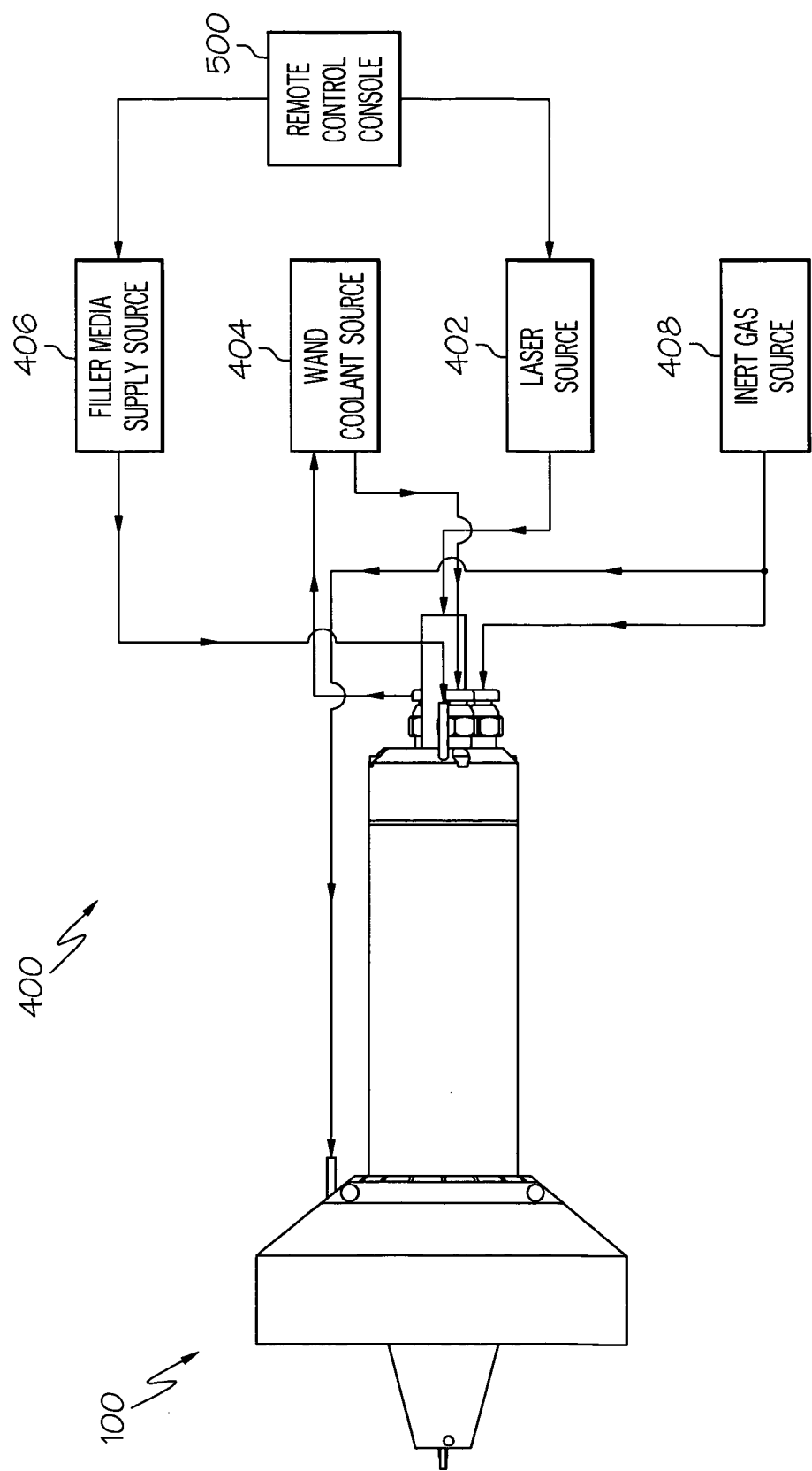
FIG. 4 is a simplified schematic representation of the hand-held laser welding wand of FIGS. 1–3 coupled to a support system.
Figure 5:
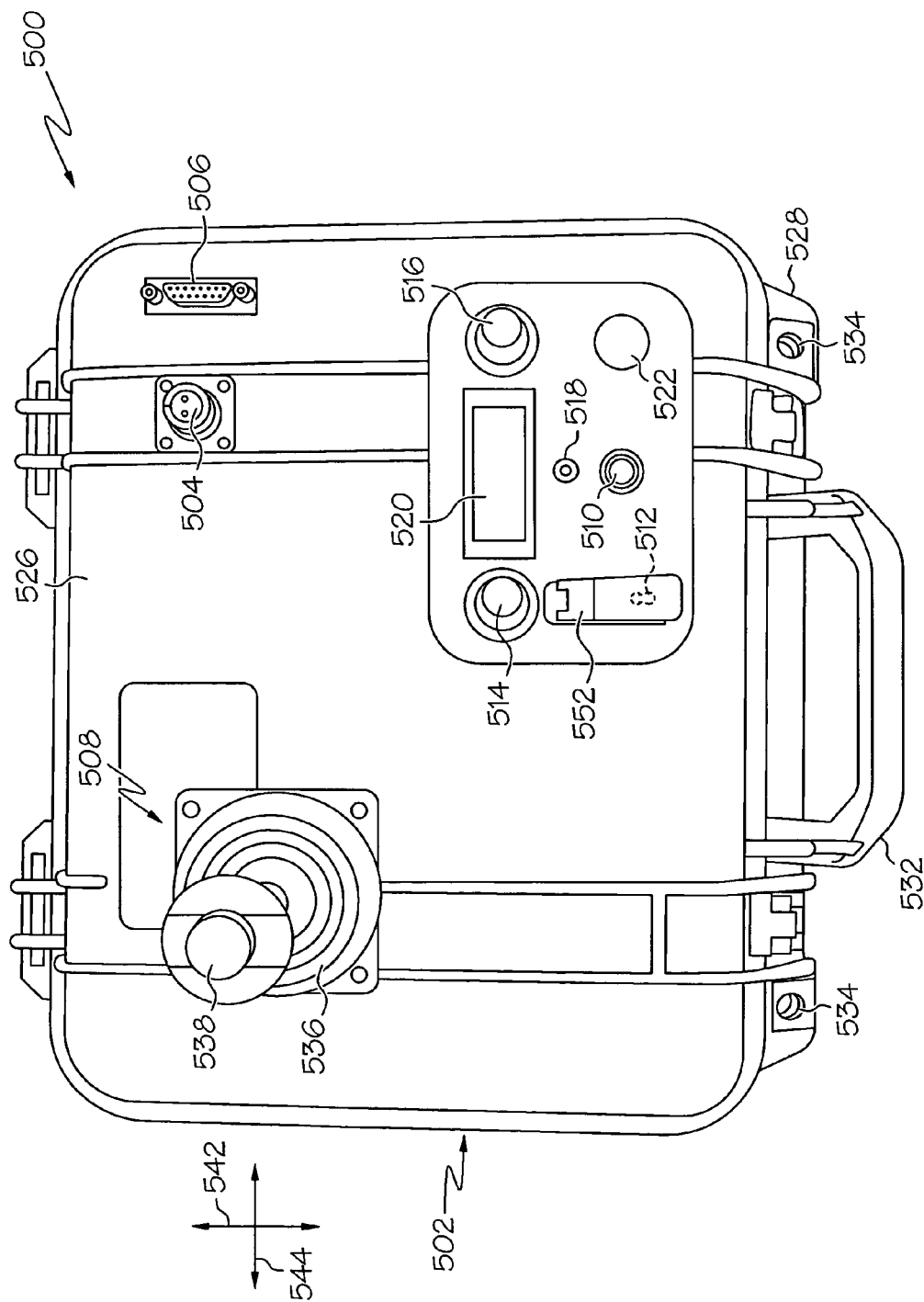
FIG. 5 is a top perspective view of remote control console that may be used to remotely control portions of the support system of FIG. 4.

With reference now to FIG. 4, an embodiment of a laser welding system 400, which includes the hand-held laser welding wand 100, is shown schematically in FIG. 4. The system 400 includes a laser source 402, a wand coolant source 404, a filler media supply source 406, and an inert gas source 408, each appropriately coupled to the wand 100. The laser source 402 and the filler media supply source 406 are each configured to be controlled using either individual, manually-actuated switches (not shown) that are separately coupled to these sources 402, 406, or using switches mounted on a relatively compact remote control console 500. An embodiment of the remote control console is shown in FIG. 5, and with reference thereto will now be described in more detail.

The control console 500 includes a housing 502, a plurality of electrical interconnects 504, 506, a plurality of switches and knobs 508–518, and a plurality of displays and indicators 520, 522. The housing 502 preferably includes at least an upper housing section 526 and a lower housing section 528 that are either wholly or partially separable from one another. This configuration allows the housing 502 to be opened and provides ready access to the interior in the event maintenance or repair operations need to be conducted on the control console 500. In the depicted embodiment, the housing 502 is formed of a relatively light-weight plastic material, though it will be appreciated that it could be formed of any one of numerous other suitable materials. Moreover, the housing 502 is configured similar to a carrying-case, such as an equipment case, and as such includes a handle 532 to facilitate hand-carrying of the control console 500.

The housing 502 additionally includes a plurality of harness attachments 534. The harness attachments 534 are configured to allow a releasable harness (not shown) such as a shoulder harness, to be selectively attached to the housing 502. With the harness attached to the harness attachments 534, and disposed on an operator, the operator may readily manipulate the hand-held laser welding wand 100 with one hand and manipulate the plurality of switches and knobs 508–518 that are mounted on the housing 502 with their other hand.

The electrical interconnects 504, 506 include a first electrical interconnect 504, which is adapted to electrically couple the control console 500 to the filler medial supply source 406, and a second electrical interconnect 506, which is adapted to electrically couple the control console 500 to the laser source 402. The first 504 and second 506 electrical interconnects are each electrically coupled to one or more of the switches and knobs 508–518. Thus, when the first 504 and second 506 electrical interconnects are electrically coupled to the filler media supply source 406 and the laser source 402, respectively, the electrical interconnects 504, 506 electrically couple one or more of the switches and knobs 508–518 to either the filler media supply source 406 or the laser source 402, as appropriate. Each of the switches and knobs 508–518 will now be described in more detail.

The control console 500 includes a multi-function control switch 508, a process control switch 510, a laser output switch 512 (shown in phantom in FIG. 5), a low power level set knob 514, a high power level set knob 516, and a display function select switch 518. The multi-function control switch 508 is electrically coupled to both the first 504 and second 506 electrical interconnects and is configured to independently and simultaneously control the filler media supply source 406 and the laser source 402. To do so, at least in the depicted embodiment, the multi-function control switch is implemented as a joystick 536 with an integrally mounted laser emission switch 538. It will be appreciated that this is merely exemplary of a particular preferred implementation, and that various other implementations could be used for the multi-function control switch 508.

The joystick 536, as is generally known, is movable in multiple directions, which may have directional vector components that lie along multiple axes. In the depicted embodiment, movement of the joystick 536 in a direction having a vector component along a first axis 542 controls the filler media supply source 406 to either supply or not supply filler media, and movement of the joystick 536 in a direction having a vector component along a second axis 544 controls the optical power level at which the laser source 402 will emit laser light.

The laser emission switch 538, which is preferably mounted on the joystick 536, is electrically coupled to the second electrical interconnect 506 and is used to control the laser source 402 to either emit or not emit laser light. In this regard, the laser emission switch 538 is a two-position switch that includes an emit position and a non-emit position, and is preferably configured to be biased toward the non-emit position. In the depicted embodiment, the laser emission switch 538 is a push button switch that is mounted on the joystick 536 for ready manipulation by an operator thumb while the operator is grasping the joystick 536 with their hand. Moreover, the laser emission switch 538 is configured such that the operator moves the laser emission switch 538 to the emit position by depressing the switch 538 downwardly. Upon releasing the laser emission switch 538, it will automatically move upwardly to return to the non-emit position. With this configuration, a positive input force to the laser emission switch 538 is required before the laser source 402 will emit laser light. It will be appreciated that this is merely exemplary of a preferred implementation, and that the laser emission switch 538 could be otherwise variously implemented.

The process control switch 510 is electrically coupled to the second electrical interconnect 506 and is electrically coupled in parallel with the laser emission switch 538. The process control switch 510 is functionally redundant to the laser emission switch 538, and thus is also a two-position switch that includes an emit position and a non-emit position, and is preferably configured to be biased toward the non-emit position. The process control switch 510, like the laser emission switch 538 is a push button switch that is moved to the emit position by depressing it and, upon releasing it, it will automatically return to the non-emit position. Thus, similar to the laser emission switch 538, a positive input force to the process control switch 510 is required before the laser source 402 will emit laser light.

No matter the position of the laser emission switch 538 or the process control switch 510, the control console 500 is further configured such that the laser source 402 will not emit laser light unless the laser output switch 512 is moved to an appropriate position. In the depicted embodiment, the laser output switch 512 is electrically coupled in series between the second electrical interconnect 506 and both the laser emission switch 538 and the process control switch 510. The laser output switch is movable between two positions, an enable position and a disable position. In the enable position, the laser output switch 512 electrically couples the laser emission switch 538 and the process control switch 510 to the second electrical interconnect 506 to thereby allow either the laser emission switch 538 or the process control switch to control laser light emission from the laser source 402. In the disable position, the laser output switch 512 electrically decouples the laser emission switch 538 and the process control switch 510 from the second electrical interconnect 506 to thereby prevent control of the laser source via the laser emission switch 538 or the process control switch 510.

As FIG. 5 also shows, a switch cover 552 is preferably mounted on the housing 502 adjacent the laser output switch 512. The switch cover 552 is configured to selectively cover (shown in FIG. 5) and uncover (not shown in FIG. 5) the laser output switch 512 to prevent and allow, respectively, movement of the laser output switch 512. The switch cover 552 is normally positioned to cover the laser output switch 512, and is manually moved to the uncover position to expose the laser output switch 512 and allow its movement to either the enable or disable position. The switch cover 552 helps ensure that the laser output switch 512 is not accidentally moved into the enable position, and thus functions as an interlock to prevent unintentional laser emission.

As was noted above, moving the joystick 536 in a direction having a vector component along the second axis 544 controls the optical power level at which the laser source 402 will emit laser light. More specifically, the joystick 536 controls the laser emission optical power level to a value between a minimum and a maximum optical power level. These minimum and maximum optical power levels are set using the low power level set knob 514 and the high power level set knob 516, respectively. The knobs 514, which are electrically coupled to the second electrical interconnect 506, are preferably configured as rotational knobs that can be locked in position. It will be appreciated, however, that this is merely exemplary, and that various other configurations could be used to implement the functionality of each knob 514, 516. No matter the particular physical implementation, the low 514 and high 516 power level set knobs are used in conjunction with the display 520 to set the minimum and maximum power levels. When doing so, it will be appreciated that the value indicated on the display 520 will be indicated in units of either optical power or percentage of full laser current, depending upon the position of the display select switch 518.

The display select switch 518 is electrically coupled to the second electrical interconnect 506 and the display 520, and is used to control the specific parameter that is displayed on the display 520. Although the number and types of parameters that may be selectively displayed may vary, in the depicted embodiment the control console 500 is configured to provide remote display of the optical power or the percentage of full laser current. In this regard, the display select switch 518 is a two-position toggle switch that is movable between a Laser Power Output position and a % Full Current position. As may be appreciated, in the Laser Power Output position, the display select switch 518 couples a signal to the display representative of the upper and lower optical power limits that can be supplied by the laser source 402, and in the % Full Current position, the display select switch 518 couples a signal to the display 520 representative of these limits in units of percentage of full laser current.

The display 520 may be implemented as any one of numerous types of displays, mounted in any one of numerous configurations. In the depicted embodiment, the display 520 is a conventional liquid crystal display (LCD) and is mounted proximate the display select switch 518 and the low 514 and high 516 power level set knobs. The display 520 is electrically coupled to the display select switch 518 and receives signals from the laser source 402, via the second electrical interconnect 506 and the display select switch 518, that are representative of either the minimum or maximum limits of optical power or percentage of full laser current. Moreover, during operation of the hand-held laser welding wand 100 the display 520 indicates either the optical power or percentage of full laser current, between the minimum and maximum values, that the laser source 402 is emitting, as determined by the position of the joystick 536.

The control console 500, as was previously noted, additionally includes a laser emission indicator 522. The laser emission indicator 522 is mounted on the housing 502 and is electrically coupled to the second electrical interconnect 506. Whenever the laser source 402 is in a configuration in which can emit laser light, the laser source 402 will supply a signal representative of this configuration. This signal is supplied to the emission indicator 522 via the electrical interconnect 506. In response, the emission indicator 522 illuminates to indicate to an operator that laser emission from the laser source 402 is enabled. If the laser emission indicator 522 is not illuminated, and the remote control console 500 is correctly connected to the laser source 402, this indicates to the operator that the laser source 402 is not yet enabled for laser light emission.

With the above-described control console 500 interconnected to the filler media supply source 406 and the laser source 402, an operator can manually manipulate the laser welding wand 100 with one hand, and independently and simultaneously control the filler media supply source 406 and the laser source 402 with another hand. In particular, assuming the low and high power levels have been set using the low 514 and high 516 power level set knobs, respectively, an operator, with one hand on the multi-function control switch 508, can independently and simultaneously control the filler media supply source 406 to supply filler material and the optical power level of the laser source 402 using the joystick 536, and independently and simultaneously control the laser source 402 to emit laser light (at the optical power level set using the joystick 536) via the laser emission switch 538.

Figure 6:
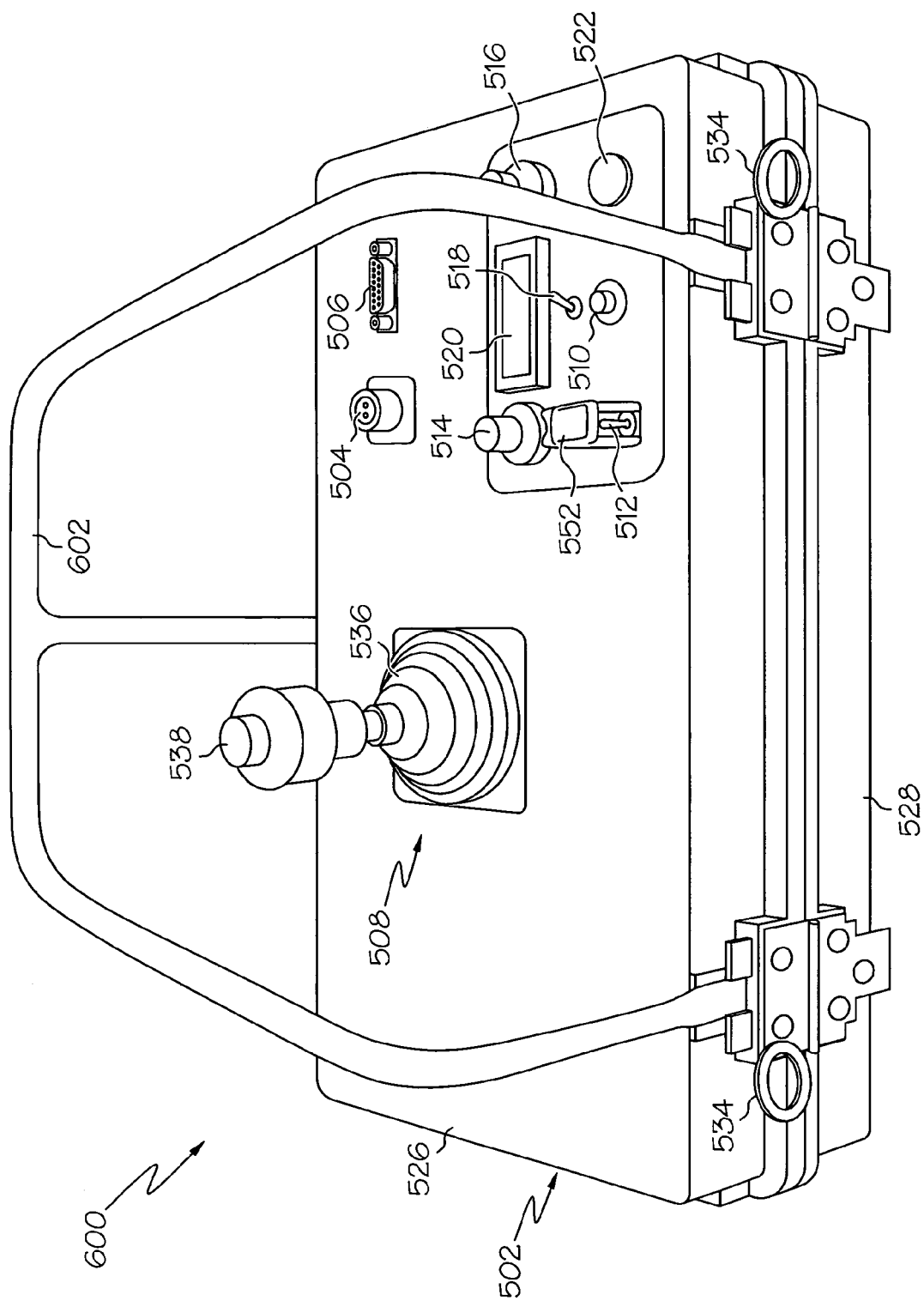
FIG. 6 is perspective view of remote control console that may be used to remotely control portions of the support system of FIG. 4 according to an alternative embodiment.

The control console 500 depicted in FIG. 5 is, as previously noted, merely exemplary of a particular preferred embodiment, and various other physical configurations could be used to implement its overall functionality. One particular exemplary alternative embodiment shown in FIG. 6, in which like reference numerals therein refer to like parts of the console shown in FIG. 5. In the embodiment depicted in FIG. 6, the control console 600 includes the same electrical interconnects 504, 506, switches and knobs 508–518, displays and indicators 520, 522, and harness attachments 534. However, the housing 502 is constructed of fiberglass and metallic materials, such as aluminum, and includes a guard bar 602. The guard bar 602 is coupled to the housing 502 and is configured to prevent, or at least inhibit, accidental actuation of the various switches and knobs 508–518. Though not depicted in FIG. 5, it will be appreciated that the control console depicted therein could also be implemented with the guard bar 602, in either the same or a different configuration.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A control console for a hand-held laser welding wand, comprising:
   a housing;
   a first electrical interconnect mounted on the housing and adapted to couple to an electrically controllable filler media supply source;
   a second electrical interconnect mounted on the housing and adapted to couple to an electrically controllable laser source;
   a control switch mounted on the housing and electrically coupled to the first and second electrical interconnects, the control switch configured to independently and simultaneously control (i) the filler media supply source to either supply or not supply filler media and (ii) the laser source to either emit or not emit laser light therefrom.

2. The control console of claim 1, wherein:
   the laser source is configured to emit laser light of varying optical power; and
   the control switch is further configured to independently and simultaneously control the optical power at which the laser source emits laser light.

3. The control console of claim 2, wherein the control switch comprises:
   a joystick electrically coupled to the first and second electrical interconnects, the joystick movable in a direction having a vector component along a first axis and a direction having a vector component along a second axis, the joystick configured, upon movement in the direction having a vector component along the first axis, to control the filler media supply source to supply or not supply filler media and, upon movement in the direction having a vector component along the second axis, to control the optical power at which the laser source will emit laser light; and
   a laser emission switch mounted on the joystick and electrically coupled to the second electrical interconnect, the emission switch movable between at least a first position, in which the laser source is responsive to emit laser light, and a second position, in which the laser source is responsive to not emit light.

4. The control console of claim 1, wherein the housing comprises:
   a lower section;
   an upper section coupled to the lower section and at least partially separable therefrom; and
   a handle coupled to either the lower section or the upper section, the handle configured to facilitate hand-carrying of the housing.

5. The control console of claim 4, wherein the first electrical interconnect, the second electrical interconnect, and the control switch are each mounted on the upper section.

6. The control console of claim 1, further comprising:
   a display mounted on the housing and electrically coupled to the second electrical interconnect, the display configured to provide a visual indication one of a plurality of parameters associated with laser source operation.

7. The control console of claim 6, further comprising:
   a display function switch mounted on the housing and electrically coupled to the second electrical interconnect, the display function switch configured to control the one parameter of the plurality of parameters that is indicated on the display.

8. The control console of claim 1, further comprising:
   a laser emission indicator mounted on the housing and electrically coupled to the second electrical interconnect, the laser emission indicator configured to illuminate upon receiving a signal from the laser source that indicates the laser source is able to emit the laser light.

9. The control console of claim 1, further comprising:
   a minimum power level adjustment knob mounted on the housing and electrically coupled to the second electrical interconnect, the minimum power level adjustment knob configured to set a minimum power level at which the laser source emits laser light; and
   a maximum power level adjustment knob mounted on the housing and electrically coupled to the second electrical interconnect, the maximum power level adjustment knob configured to set a maximum power level at which the laser source emits laser light.

10. The control console of claim 9, wherein:
    the laser source is configured to emit laser light of varying optical power;
    the control switch is further configured to independently and simultaneously control the optical power at which the laser source emits laser light to between the minimum power level and the maximum power level set by the minimum power level adjustment knob and the maximum power level adjustment knob, respectively.

11. The control console of claim 1, further comprising:
    a laser output switch electrically coupled in series between the first switch and the second electrical interconnect, the laser output switch movable between (i) an enable position, in which the laser output switch electrically couples the first switch to the second electrical interconnect to thereby allow control of the laser source via the first switch, and (ii) a disable position, in which the laser output switch electrically decouples the first switch from the second electrical interconnect to thereby prevent control of the laser source via the first switch.

12. The control console of claim 1, further comprising:
a process control switch electrically coupled to the second electrical interconnect and electrically coupled in parallel with the first switch, the process control switch movable between at least a first position and a second position, to control the laser source, independently of the first switch, to either emit or not emit laser light therefrom, respectively.

13. A control console for a hand-held laser welding wand, comprising:
a housing;
a first electrical interconnect mounted on the housing and adapted to couple to an electrically controllable filler media supply source;
a second electrical interconnect mounted on the housing and adapted to couple to an electrically controllable laser source;
a control switch mounted on the housing and electrically coupled to the first and second electrical interconnects, the control switch configured to independently and simultaneously control (i) the filler media supply source to either supply or not supply filler media (ii) the laser source to either emit or not emit laser light therefrom at an optical power level and (iii) the optical power level at which the laser source emits the laser light.

14. The control console of claim 13, wherein the control switch comprises:
a joystick electrically coupled to the first and second electrical interconnects, the joystick movable in a direction having a vector component along a first axis and a direction having a vector component along a second axis, the joystick configured, upon movement in the direction having a vector component along the first axis, to control the filler media supply source to supply or not supply filler media and, upon movement in the direction having a vector component along the second axis, to control the optical power at which the laser source will emit laser light; and
a laser emission switch mounted on the joystick and electrically coupled to the second electrical interconnect, the emission switch movable between at least a first position, in which the laser source is responsive to emit laser light, and a second position, in which the laser source is responsive to not emit light.

15. The control console of claim 13, wherein the housing comprises:
a lower section;
an upper section coupled to the lower section and at least partially separable therefrom; and
a handle coupled to either the lower section or the upper section, the handle configured to facilitate hand-carrying of the housing.

16. The control console of claim 15, wherein the first electrical interconnect, the second electrical interconnect, and the control switch are each mounted on the upper section.

17. The control console of claim 13, further comprising:
a display mounted on the housing and electrically coupled to the second electrical interconnect, the display configured to provide a visual indication one of a plurality of parameters associated with laser source operation.

18. The control console of claim 17, further comprising:
a display function switch mounted on the housing and electrically coupled to the second electrical interconnect, the display function switch configured to control the one parameter of the plurality of parameters that is indicated on the display.

19. The control console of claim 13, further comprising:
a laser emission indicator mounted on the housing and electrically coupled to the second electrical interconnect, the laser emission indicator configured to illuminate upon receiving a signal from the laser source that indicates the laser source is able to emit the laser light.

20. The control console of claim 13, further comprising:
a minimum power level adjustment knob mounted on the housing and electrically coupled to the second electrical interconnect, the minimum power level adjustment knob configured to set a minimum power level at which the laser source emits laser light; and
a maximum power level adjustment knob mounted on the housing and electrically coupled to the second electrical interconnect, the maximum power level adjustment knob configured to set a maximum power level at which the laser source emits laser light.

21. The control console of claim 20, wherein:
the control switch independently and simultaneously controls the optical power level at which the laser source emits the laser light to between the minimum power level and the maximum power level set by the minimum power level adjustment knob and the maximum power level adjustment knob, respectively.

22. The control console of claim 13, further comprising:
a laser output switch electrically coupled in series between the first switch and the second electrical interconnect, the laser output switch movable between (i) an enable position, in which the laser output switch electrically couples the first switch to the second electrical interconnect to thereby allow control of the laser source via the first switch, and (ii) a disable position, in which the laser output switch electrically decouples the first switch from the second electrical interconnect to thereby prevent control of the laser source via the first switch.

23. The control console of claim 13, further comprising:
a process control switch electrically coupled to the second electrical interconnect and electrically coupled in parallel with the first switch, the process control switch movable between at least a first position and a second position, to control the laser source, independently of the first switch, to either emit or not emit laser light therefrom, respectively.

24. A control console for a hand-held laser welding wand, comprising:
a housing;
a first electrical interconnect mounted on the housing and adapted to couple to an electrically controllable filler media supply source;
a second electrical interconnect mounted on the housing and adapted to couple to an electrically controllable laser source;
a joystick electrically coupled to the first and second electrical interconnects, the joystick movable in a direction having a vector component along a first axis and a direction having a vector component along a second axis, the joystick configured, upon movement in the direction having a vector component along the first axis, to control the filler media supply source to supply or not supply filler media and, upon movement in the direction having a vector component along the second axis, to control the optical power at which the laser source will emit laser light; and a laser emission switch mounted on the joystick and electrically coupled to the second electrical interconnect, the emission switch movable between at least a first position, in which the laser source is responsive to emit the laser light at the optical power level set by the joystick, and a second position, in which the laser source is responsive to not emit the laser light.

* * * * *